United States Patent [19]

Cassidy et al.

[11] Patent Number: 4,668,756
[45] Date of Patent: May 26, 1987

[54] AZETIDINEDIONE-MONOCARBONAMIDE CAPPED PREPOLYMER

[75] Inventors: Edward F. Cassidy, Madison; David J. Goldwasser, Cheshire; Kemal Onder, North Haven, all of Conn.

[73] Assignee: The Dow Chemical Company, Midland, Mich.

[21] Appl. No.: 800,239

[22] Filed: Nov. 21, 1985

[51] Int. Cl.$^4$ .................... C08G 18/28; C08G 69/14
[52] U.S. Cl. ...................... 528/69; 528/73; 528/322; 528/323
[58] Field of Search ................ 528/322, 323, 69, 73

[56] References Cited

U.S. PATENT DOCUMENTS

| | | | |
|---|---|---|---|
| 3,862,262 | 1/1975 | Hedrick et al. | 260/857 PG |
| 4,031,164 | 6/1977 | Hedrick et al. | 260/857 PG |
| 4,034,015 | 7/1977 | Hedrick et al. | 260/857 PG |
| 4,550,157 | 10/1985 | Dai et al. | 528/322 |

*Primary Examiner*—Harold D. Anderson
*Attorney, Agent, or Firm*—J. S. Rose

[57] ABSTRACT

Novel polyamide block copolymers are provided which comprise a central block of a soft segment derived from the residue of a polymeric polyol or polycarboxylic acid joined to terminal hard segment polyamide blocks. The linkages which join the blocks are of a novel type and are the opened form of certain monoazetidine-2,4-dione rings.

The block copolymers can be prepared very rapidly via anionically polymerizing lactams on to prepolymer soft segments containing terminal azetidine-2,4-dione rings.

The speed with which the polymerizations can be carried out make the block copolymers particularly useful for the RIM preparation of molded parts.

19 Claims, No Drawings

AZETIDINEDIONE-MONOCARBONAMIDE CAPPED PREPOLYMER

FIELD OF THE INVENTION

This invention relates to the preparation of polyamides and is more particularly concerned with the preparation of polyamide block copolymers and certain azetidine-2,4-dione prepolymer intermediates therefor.

DESCRIPTION OF THE PRIOR ART

The rapid anionic polymerization of lactams in general, and, caprolactam in particular, to polyamide or polylactam polymers has long been known and practiced in the art. Further, it is known that the copolymerization of lactams in the presence of polyols provides very fast polymerizing systems suitable for the preparation of RIM (reaction injection molded) parts; see U.S. Pat. Nos. 3,862,262; 4,031,164 and 4,034,015.

In the patents cited supra the lactam monomer and polyol are polymerized in the presence of a lactam polymerization catalyst and either acyl polylactam or polyacyl lactam with the latter two reactants serving as the units which couple the recurring amide and polyol residues in the polymer chains. In an optional embodiment, the polyols and acyl polylactam or polyacyl lactams can be prereacted prior to the lactam polymerization.

We have now discovered what we believe to be a new class of anionically polymerized lactam based polyamide block copolymers wherein residues of polymeric polyols or polymeric polycarboxylic acids serve as the central soft segment block for the copolymer with the polyamide blocks attached to terminal positions of the soft segment. The polyamide blocks are attached to the soft segments through linkages which are entirely different from the residues arising from the acyl polylactams and polyacyl lactams of the prior art. The linkages in the present copolymers provide sites which can be substituted by a variety of groups thereby serving as a means for modifying the polymer properties.

The present polyamide block copolymers are distinguished over a related class of polyamide block copolymers disclosed in copending application Ser. No. 608,004 filed May 7, 1984 now U.S. Pat. No. 4,550,157 by having a key difference in the linkages joining the soft segments to the polyamide blocks. The present copolymers are derived from azetidinedione monocarbonamide capped prepolymers, whereas those disclosed in the copending application are derived from azetidinedione capped prepolymers having a multiplicity of oligomeric carbonamide groups. This difference gives rise to the present polymer backbones with less branching, better control of polymer backbone structure, and, thus, more reproducible polymer properties than those of the copending application.

SUMMARY OF THE INVENTION

This invention comprises polyamide block copolymers having the formula (I) [see FORMULA CHART below] wherein A is the residue of a polymeric polyol or a polycarboxylic acid having a molecular weight of from about 500 to about 8000 and a functionality m of from about 2 to about 6, Y represents —O— when said A is the residue of a polymeric polyol or a direct bond when A is the residue of a polycarboxylic acid, R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, X is selected from the group consisting of lower alkylene, cycloalkylene, arylene, and divalent radicals having the formula shown as X in the FORMULA CHART below wherein Z is selected from the group consisting of —CO—, —O—, —SO$_2$—, and alkylene having 1 to 4 carbon atoms, inclusive, $C_nH_{2n}$ represents an alkylene radical of 3 to 12 carbon atoms, inclusive, present in a polyamide recurring unit wherein q has a mean value of at least about 2, and B is a polyamide chain terminating group.

The invention also comprises azetidine-2,4-dione monocarbonamide capped prepolymers having the formula (III) [FORMULA CHART] wherein m, R, $R_1$, and X have the same definition as set forth above but A is limited to the residue of a polycarboxylic acid having a molecular weight of from about 500 to about 8000.

The invention also comprises the method for the preparation of the polyamide block copolymers (I) by the reaction injection molding procedure.

The term "residue of a polymeric polyol or a polycarboxylic acid" means the radical remaining after the removal of the hydroxyl groups or carboxylic acid groups from the polyol or polycarboxylic acid respectively having the molecular weight and functionality defined above.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like, including isomeric forms thereof; and cycloalkenyl such as cyclopentenyl, cyclohexenyl, cycloheptenyl, cyclooctenyl, and the like, including isomeric forms thereof.

The hydrocarbyl groups which form the groups R and $R_1$ can be substituted by one or a plurality of inert substituents. The term "inert substituent" means a substituent which is inert under the conditions of the polymerization process and does not otherwise interfere with said process or the resulting copolymer or the azetidine-2,4-dione prepolymer. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

Illustrative of the term "cycloalkane having 4 to 8 ring carbon atoms" are cyclobutane, 3-methylcyclobutane, cyclopentane, 3-methylcyclopentane, cyclohexane, 3-methylcyclohexane, 4-methylcyclohexane, cycloheptane, 4-methylcycloheptane, cyclooctane, 5-methylcyclooctane and the like.

The term "lower-alkylene" means straight and branched chain alkylene having 1 to 8 carbon atoms, inclusive, such as methylene, ethylene, propylene, butylene, pentylene, hexylene, heptylene, octylene, and isomeric forms thereof.

The term "cycloalkylene" means cycloalkylene having 5 to 6 ring carbon atoms, inclusive, such as 1,3-cyclopentylene, 1,3-cyclohexylene, 1,4-cyclohexylene, 2-methyl-1,4-cyclohexylene, and the like.

The term "arylene" means arylene having 6 to 18 carbon atoms, inclusive, such as phenylene, tolylene, naphthylene, diphenylylene, and the like.

Illustrative of the alkylene radical -$C_nH_{2n}$ having 3 to 12 carbon atoms, inclusive, are 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 2-methyl-1,5-pentylene, 2-ethyl-1,5-pentylene, 2,3-dimethyl-1,5-pentylene, and the like.

The term "polyamide chain terminating group" means any chemical group which terminates the polyamide chain and is generated either internally from reacting monomer or impurities; or else, externally, by the addition of a specific chain modifying or terminating reagent; the term is inclusive, but not limiting, of, lactam radicals, alkoxy radicals, cycloalkoxy radicals, aralkoxy radicals, alkyl amino radicals, aryl amino radicals, and the like.

DETAILED DESCRIPTION OF THE INVENTION

The copolymers in accordance with the present invention are prepared by anionically polymerizing the appropriate lactam on to the terminal azetidine-2,4-dione groups of the novel azetidine-2,4-dione monocarbonamide capped prepolymers (III) or else on to the known class of azetidine-2,4-dione monocarbonamide capped prepolymers (VI) discussed below. The radical Y in the former copolymers represents a direct bond, whereas in the latter it represents —O—.

Accordingly, the copolymers contain a number of polyamide blocks arising from the lactam polymerization which blocks can be regarded as hard segments. The number of these hard segments is from 2 to 6 depending on the value of m in formula (I). The number of recurring amide units in any segment is governed by the value of q.

Because of the hard segments the present copolymers are crystalline polymers, however, their hard crystalline properties are easily modified by the presence of the soft segments arising from (III) or (VI).

The azetidine-2,4-dione prepolymer which becomes incorporated as a central block in the copolymer contains the residues (A) of polymeric polyols or polycarboxylic acids and can be regarded as a soft segment. Therefore, the proportion in which the prepolymers are included in the copolymers, or, conversely, the length of the hard segments, has a direct bearing on copolymer properties. Specifically, as the soft segment proportion is increased the properties of the hard polyamide segments are modified toward more resilient polymers having higher elasticity.

In connection with the relative proportions of hard to soft segments, advantageously the polyamide blocks fall within a range of from about 25 to about 90 percent by weight of the total copolymer weight. Preferably the polyamide blocks are from about 50 to about 85 percent by weight of the total.

Generally speaking, the higher the branching in the copolymers, (i.e. the greater the value of m) the more deleterious the effect on final polymer properties. The value of m in (III) and (VI), and, ultimately in (I), controls the degree of branching. This value is controlled by the choice of polyol or polycarboxylic acid functionality.

Accordingly, the preferred value of m is from about 2 to about 3.

It will be recognized by one skilled in the art that the mean value for q for any given hard segment will vary considerably depending on such factors as the number of hard segments present (i.e. the value of m), the weight percent content of polyamide, and the distribution of the amide units. In this connection, the mean value of q is a least about 2, and, preferably, at least about 10.

Preferred lactams for the preparation of the copolymers (I) are those wherein $C_nH_{2n}$ represents straight chain alkylene —$(CH_2)_n$— wherein n=3 to 12, inclusive, and, most preferably, 5 to 11, inclusive. Illustrative of the lactams are pyrrolidone, piperidone, caprolactam, 4-methylcaprolactam, 4,5-dimethylcaprolactam, 4-ethylcaprolactam, heptanolactam, octanolactam, nonanolactam, decanolactam, undecanolactam, laurolactam, and the like. Preferred of the above species are the caprolactams with caprolactam itself being the most preferred. Mixtures of two or more lactams are also contemplated in the present lactam copolymers.

A preferred class of polyamide block copolymers in accordance with the present invention have the formula (II) [see FORMULA CHART below] wherein B, q, R, $R_1$ and X are defined as above, p has a value from about 2 to about 3, and A in this case is the residue of a polycarboxylic acid having a molecular weight of from about 1000 to about 6000.

The anionic polymerization of the lactam with the azetidine-2,4-dione prepolymer is readily carried out using polymerization conditions analogous to those described in the prior art; for example, see U.S. Pat. No. 4,031,164 cited supra for typical reaction conditions and whose teaching is incorporated herein by reference.

The lactam and prepolymer are advantageously heated in the absence of air and moisture at a temperature within a range of from about 80° C. to about 300° C. until the polymerization of the lactam is completed. Preferably, the temperature range is from about 90° C. to about 250° C.

While any of the known anionic lactam polymerization catalysts can be employed such as the ones disclosed in U.S. Pat. No. 4,031,164 cited supra, a preferred group comprises the Grignard type reagents such as methyl magnesium bromide, ethyl magnesium bromide, and the like.

The optimum proportion of catalyst employed for any given polymerization is easily determined by trial and error methods. Generally speaking, the catalyst is employed in a range of from about 0.1 mole percent to about 10 mole percent based on lactam.

The azetidine-2,4-dione groups on the ends of the prepolymers act as promoters by activating the anionically catalyzed ring opening polymerization of lactams. Also, the azetidinedione ring is opened in the course of the polymerization and acts as the linkage between the polyamide segments and the soft segment.

Generally speaking, and, in the preferred embodiment, the chain terminating group is simply an unopened lactam ring. That is to say, when all of the lactam monomer has been consumed, the terminating group remains as an unopened cyclic lactam at the end of each polyamide chain. Optionally, other chain modifying or terminating groups can be formed through the addition of specific reagents to the polymerizing reactants. For example, monofunctional alcohols may be added in proportions of from about 0.1 percent to about 150 percent of the molar equivalents of the azetidinedione prepolymers (III) and (VI). This technique of alcohol addition is set forth in detail in U.S. Pat. No. 4,034,015 whose disclosure relative thereto is incorporated herein by reference. Illustrative alcohols are methanol, ethanol, butanol, dodecanol, N,N-dimethylethanolamine, cyclohexanol, benzyl alcohol, and the like. Amines also may be added as terminators in the same proportions set forth above as taught by Mottus et al in Polymer Preprints, American Chemical Society, April 1968, Vol. 9, No. 1, pp. 390 to 397. Illustrative amines are hexylamine, aniline, m-toluidine, di-n-butylamine, N-methylaniline, dicyclohexylamine, and the like.

Because of the rapid promotion of the lactam polymerization process by these terminal azetidinedione groups, the present copolymers are particularly adaptable to preparation via RIM methods. In this regard, see U.S. Pat. No. 4,342,841 and references cited therein for typical methods for the preparation of polyamides by RIM procedures which teaching is incorporated herein by reference.

For example, the reactants comprising the azetidine-2,4-dione monocarbonamide capped prepolymer (III) or (VI), a lactam, and a lactam polymerization catalyst are injected into a closed mold of the RIM machine.

The novel azetidine-2,4-dione prepolymers (III) are obtained via the reaction of the monoisocyanatoazetidinedione (IV) with the pblycarboxylic compound (V) as shown in the equation set forth in the REACTION CHART below. The significance of R, $R_1$, X, and m are as defined hereinabove, while A is limited to the residue of a polycarboxylic acid having the functionality and molecular weight defined above for A. The appropriate stoichiometric proportions of the isocyanate are employed to react with substantially all of the carboxylic acid groups to form the amide linkages with carbon dioxide evolution.

Any of the well-known procedures in the art for reacting isocyanate compounds with carboxylic acid groups to form amide linkages either with or without solvent, can be employed in preparing the prepolymers; see U.S. Pat. Nos. 4,001,186 and 4,021,412 whose disclosures are incorporated herein by reference. Optionally, solvents can be employed but are not particularly necessary. In fact, it is preferred to operate in the absence of solvent because the prepolymers can then be obtained directly without the need for any purification steps.

Typically, (IV) and (V) are heated together in substantially equivalent proportions of carboxylic acid to isocyanate groups at a temperature of from about 50° C. to about 250° C., preferably 100° C. to about 200° C. until completion of the reaction. Preferably, the reaction is carried out under an inert atmosphere and with efficient mixing to facilitate carbon dioxide removal. Advantageously, the heating is carried out for a period of from about 0.5 hour to about 24 hours, preferably from about 1 hour to about 8 hours. It will be understood by those skilled in the art that when the reaction is conducted in solvents, particularly preferred ones such as dipolar aprotic solvents, that the above temperatures and reaction times will be altered accordingly, generally speaking, to lower temperatures and times.

Optionally, and, preferably, catalysts such as alkali metal lactamates and alkali metal alkoxides are employed; for typical catalysts see U.S. Pat. Nos. 4,001,186 and 4,021,412 cited supra. The phospholene oxides are particularly preferred catalysts; see U.S. Pat. No. 4,156,065 whose disclosure relative thereto is incorporated herein by reference.

The prepolymers (III) are obtained as stable tractable viscous liquids. They are characterized by viscosities falling within the range of from about 4000 cps to about 100,000 cps at 25° C.

The preferred classes of azetidine-2,4-diones (IV) for the preparation of both (III) and (VI) discussed below are those wherein X is arylene and the divalent radicals X defined above and R and $R_1$ are the same or different alkyl groups having 1 to 4 carbon atoms, inclusive.

Illustrative but not limiting of the isocyanatoazetidinediones are N-(6-isocyanatohexyl)-azetidine-2,4-dione, N-(6-isocyanatohexyl)-3,3-dimethylazetidine-2,4-dione, N-(6-isocyanatohexyl)-3,3-diethylazetidine-2,4-dione, N-(6-isocyanatohexyl)-3-ethyl-3-butylazetidine-2,4-dione, N-(6-isocyanatohexyl)-3-methyl-3-allylazetidine-2,4-dione, N-(6-isocyanatohexyl)-3-benzylazetidine-2,4-dione, N-(6-isocyanatohexyl)-3-phenylazetidine-2,4-dione, N-(6-isocyanatohexyl)-3,3-pentamethyleneazetidine-2,4-dione, N-(3-isocyanatocyclopentyl)-3,3-dimethylazetidine-2,4-dione, N-(4-isocyanatocyclohexyl)-3,3-dimethylazetidine-2,4-dione, N-(4-isocyanatocyclohexyl)-3-ethyl-3-butylazetidine-2,4-dione, N-(4-isocyanatophenyl)-3,3-dimethylazetidine-2,4-dione, N-(4-isocyanatophenyl)-3,3-dibutylazetidine-2,4-dione, N-(4-isocyanatophenyl)-3-ethyl-3-butylazetidine-2,4-dione, N-(3-isocyanato-4-methylphenyl)-3,3-dimethylazetidine-2,4-dione, N-(3-isocyanato-4-methylphenyl)-3,3-diethylazetidine-2,4-dione, N-(3-isocyanato-4-methylphenyl)-3-ethyl-3-butylazetidine-2,4-dione, N-(3-isocyanato-6-methylphenyl)-3,3-dimethylazetidine-2,4-dione, N-(3-isocyanato-6-methylphenyl)-3-ethyl-3-butylazetidine-2,4-dione, N-(2-methyl-3-isocyanatophenyl)-3,3-dimethylazetidine-2,4-dione, N-(2-methyl-3-isocyanatophenyl)-3,3-diethylazetidine-2,4-dione, N-(2-methyl-3-isocyanatophenyl)-3-ethyl-3-butylazetidine-2,4-dione, 4-isocyanato-4'-(3,3-dimethyl-2,4-dioxo-azetidino)diphenylmethane, 4-isocyanato-4'-(3,3-diethyl-2,4-dioxo-azetidino)diphenylmethane, 4-isocyanato-4'-(3,3-dipropyl-2,4-dioxo-azetidino)diphenylmethane, 4-isocyanato-4'-(3-ethyl-3-butyl-2,4-dioxo-azetidino)diphenylmethane, 4-isocyanato-4'-(3-benzyl-2,4-dioxo-azetidino)diphenylmethane, 4-isocyanato-4'-(3-phenyl-2,4-dioxo-azetidino)diphenylmethane, 4-isocyanato-4'-(3,3-pentamethylene-2,4-dioxo-azetidino)diphenylmethane, and mixtures of the above in any proportions, particularly the isomeric compounds.

A particularly preferred group of isocyanatoazetidinediones comprises N-(3-isocyanato-4-methylphenyl)-3-ethyl-3-butylazetidine-2,4-dione, N-(3-isocyanato-6-methylphenyl)-3-ethyl-3-butylazetidine-2,4-dione, N-(2-methyl-3-isocyanatophenyl)-3-ethyl-3-butylazetidine-2,4-dione, and mixtures of any of the above in any proportions; and 4-isocyanato-4'-(3-ethyl-3-butyl-2,4-dioxo-azetidino)diphenylmethane.

The isocyanato-azetidinediones are prepared by processes which are well known to those skilled in the art.

Illustratively, the compounds can be prepared using a procedure analogous to that set forth in U.S. Pat. No. 3,265,684.

The polycarboxylic compounds (V) and polymeric polyols (VII) defined above are well-known in the art, and, for the most part, are commercially available materials.

The preferred polycarboxylic compounds (V) fall within a molecular weight range of from about 1000 to about 6000, most preferably from about 2000 to about 4000. Also, in accordance with the preferred value of m set forth above the preferred functionality is about 2 to about 3.

Any type of compound falling within the molecular weight limitations set forth above and having carboxylic acid functionality falling within the prescribed ranges, particularly 2 to 3, can be employed in the present polymers.

Illustrative, but not limiting, of the classes of polycarboxylic compounds are the carboxylic acid terminated polyesters prepared by reacting polycarboxylic acids such as succinic, adipic, suberic, azelaic, isophthalic, terephthalic, and the like in stoichiometric excess with hydroxyl monomers of the class of alkylene glycols and oxyalkylene glycols such as ethylene glycol, propylene glycol, butylene glycol, diethylene glycol, trimethyolpropane, glycerine, and the like; the carboxylic acid terminated polyalkyleneoxy polyethers prepared by esterifying the polyalkyleneoxy polyols well known in the art with a carboxylic acid of the type disclosed above; and carboxylic acid terminated polybutadienes and polybutadiene-polyacrylonitrile copolymers; examples of the latter class of polycarboxylic acids which are well known commercially are the Hycar ® carboxyl terminated liquid polymers supplied by B. F. Goodrich.

A preferred group of polycarboxylic acids comprises the esterified polyalkyleneoxy polyols, and the acid terminated polybutadienes and polybutadienepolyacrylonitrile copolymers.

The other class of azetidine-2,4-dione monocarbamide capped prepolymers (VI) have been disclosed in copending application Ser. No. 608,005 filed May 7, 1984, now U.S. Pat. No. 4,576,747. They are obtained via the reaction of (IV) with the polyol defined by formula (VII) as shown in the equation set forth in the REACTION CHART below. The significance of R, $R_1$, X, and m in (IV) and (VII) are as defined hereinabove, while A is limited to the residue of a polyol having the functionality and molecular weight defined above for A. The appropriate stoichiometric proportions of the isocyanate are employed to react with substantially all of the hydroxyl functionality. Any of the well known procedures in the art for reacting isocyanate compounds with hydroxyl containing compounds to form urethanes and polyurethanes, either with or without solvent, can be employed in preparing the compounds (VI). For detailed methods and illustrative techniques for urethane preparation see Saunders and Frisch, Polyurethanes Chemistry and Technology, Part I, and Part II, 1962, Interscience Publishers, New York, N.Y.

The azetidinedione urethane prepolymers are obtained as stable tractable viscous liquids. They are characterized by viscosities falling within the range of from about 2000 cps to about 100,000 cps at 25° C.

The preferred polyols (VII) fall within a molecular weight range of from about 1000 to about 6500 and with a value of m of from about 2 to about 3.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example those derived from butanediol with diarylcarbonates; polyester amides, the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the polypropyleneoxy-polyethyleneoxy capped diols and triols obtained by the alkoxylation of water, ethylene glycol, propylene glycol, aniline, glycerine, trimethylolpropane, and the like; the polyester diols obtained from the reaction of dibasic carboxylic acids such as succinic, adipic, suberic, azelaic, phthalic and isophthalic acids, and the like, with alkylene glycols and oxyalkylene glycols to form the corresponding polyalkylene, and polyoxyalkylene ester diols or copolymers thereof.

The copolyamides described above in accordance with the present invention are characterized by certain advantageous properties particularly in regard to when they are molded. Included in these properties is very easy and rapid release of the molded polymer from the mold without the need of either internal or external release agents. The molded parts have very smooth and blemish-free surfaces. The polymers themselves are readily prepared by solvent-free melt-processing techniques such as RIM, melt-extrusion, and the like.

As noted above the very rapid polymerization rate of the present polymers makes them particularly adaptable to RIM procedures.

Surprisingly, the polymers can be exposed to rather rigid thermal histories including compression molding, extrusion, mechanical mixing and blending at high temperatures all with relatively little or no loss of molecular weight.

Generally speaking, the impact strengths of the present polymers are much improved over unmodified polycaprolactams. Furthermore, the impact strengths can be easily modified through the choice of particular polymer backbone components.

Further modification of copolymer properties is readily accomplished by the addition of fillers such as clay, feldspar, wollastonite, calcined kaolin, and the like; reinforcing materials such as fiber glass strands and roving, organic fibers such as poly(benzamide), graphite fibers, and the like; stabilizers, anti-oxidants, wax lubricants, internal release agents, plasticizers, flame retardants, colorants, and the like.

The copolymers in accordance with the present invention can be obtained in the form of very hard high modulus thermoset plastics or in the preferred form of thermoplastics enjoying all of the major benefits inherent in such materials such as moldability, ease of extrusion and injection molding, the solvent solubility characteristics of nylon type polyamides, and the like. Furthermore, the preferred thermoplastic polyamide products can be tailored from soft elastomers to tough structural plastics by varying the type and amount of prepolymers as discussed fully above.

The copolymers in accordance with the present invention can be used as molding powders, for the preparation of fibers and coatings from solution, and for injection molding, extruding, casting, and the like. More importantly, because of the very rapid polymerization of the instant polymers, they are very useful for the preparation of molded parts by the RIM method. The solid polymers so obtained can be used in bushings, seal faces, electric insulators, impellers, pistons and piston rings, gears, thread guides, cams, brake linings, clutch faces and abrasive articles, RIM prepared auto parts such as body elements, panels, doors, engine hoods, skirts, air scoops, and the like.

The azetidine-2,4-dione prepolymers (III) in accordance with the present invention find their primary utility in the preparation of the polyamide block copolymers of the present invention.

The following examples describe the manner and process of making and using the invention and set forth the best mode contemplated by the inventors of carrying out the invention but are not to be construed as limiting.

anate groups which arose through the reaction of both isocyanate groups on the one toluene diisocyanate with 2-ethylhexanoyl chloride to form the bis(diazetidinedione). The monoisocyanato-azetidinedione reactant was comprised of about 47 percent by weight of N-(3-isocyanato-4-methylphenyl)-3-ethyl-3-butylazetidine-2,4-dione, about 25 percent by weight of N-(2-methyl-3-isocyanatophenyl)-3-ethyl-3-butylazetidine-2,4-dione, about 18 percent by weight of N-(3-isocyanato-6-methylphenyl)-3-ethyl-3-butylazetidine-2,4-dione, and about 10 percent by weight of the bis(diazetidinedione) described above. The latter was comprised of about 8 percent by weight of 1-methyl-2,4-bis-(3-ethyl-3-butyl-2,4-dioxo-azetidine)benzene and 2 percent by weight of 1-methyl-2,6-bis(3-ethyl-3-butyl-2,4-dioxo-azetidino)-benzene.

Thin film infrared analysis of the viscous liquid reaction product showed the absence of NCO absorption with no carbodiimide formation and essentially all the COOH functionality gone. Strong amide absorption at 3400 to 3500 cm$^{-1}$ was evident.

Thus there was obtained an azetidinedione-monocarbonamide capped prepolymer in accordance with formula (III) above and having the formula

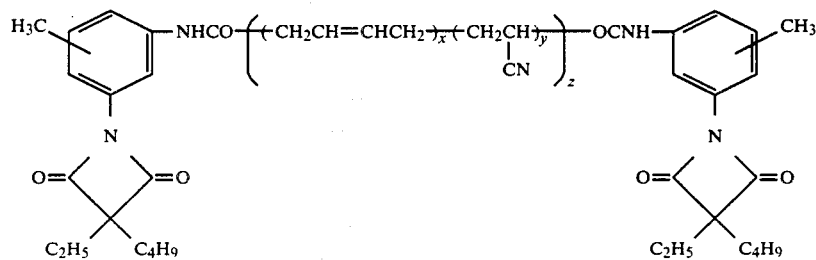

wherein the calculated values of x, y, and z are about 5, 1, and 8.3 respectively, along with about 2 percent by weight (by theory) of the diazetidinedione impurity described above.

EXAMPLE 1

The following experiment describes the preparation of an azetidinedione-monocarbonamide capped prepolymer in accordance with the present invention.

A one liter reaction kettle equipped with a stirrer, condenser, thermometer, and addition funnel was charged with 138.9 g. (0.1 equivalent based on COOH) of a difunctional carboxylic acid terminated polybutadiene nitrile rubber containing 18 percent by weight of acrylonitrile copolymer (supplied by B. F. Goodrich as Hycar® 1300X9; equivalents per hundred parts of resin of 0.072; mole wt.=2778), and 0.131 g. (1 mole percent based on moles of Hycar) of 1,3-dimethyl-3-phospholene-1-oxide. Under a nitrogen atmosphere the reaction kettle and contents were heated to 175° to 178° C. during continual stirring.

Over a period of about 2.5 hours there was added dropwise, using a heat lamp on the addition funnel, 23.6 g. (0.1 equivalent based on NCO) of the monoisocyanato-azetidinedione mixture prepared by reacting in molar proportions 0.3 mole of toluene diisocyanate (2,4/2,6-isomer ratio of 80/20) with 0.15 mole of 2-ethylhexanoyl chloride and 0.3 mole of triethylamine in xylene in accordance with U.S. Pat. No. 3,265,684. This monoisocyanato-azetidinedione had an NCO equivalent weight of 236 and contained about 10 percent by weight of a bis(diazetidinedione) impurity containing no isocy-

EXAMPLE 2

The same apparatus and procedure described in Example 1 along with the same ingredients and proportions except for the monoisocyanato-azetidinedione as noted below were used to prepare an azetidinedione-monocarbonamide capped prepolymer in accordance with the present invention.

The monoisocyanato-azetidinedione added to the Hycar 1300X9 over the 2.5 hour period was 24.0 g. (0.1 equivalent based on NCO) of the product obtained from the reaction of 2,4-toluene diisocyanate with isobutyryl chloride under the same basic conditions described in Example 1 above in accordance with U.S. Pat. No. 3,265,684. This monoisocyanato-azetidinedione was predominantly N-(3-isocyanato-4-methylphenyl)-3,3-dimethylazetidine-2,4-dione with a minor proportion of the isomeric N-(3-isocyanato-6-methylphenyl)-3,3-dimethylazetidine-2,4-dione.

The product obtained after the reaction of the Hycar with the monoisocyanato compound was a viscous liquid. Infrared analysis showed the absence of NCO and COOH with no carbodiimide and the presence of strong amide absorption at 3400 to 3500 cm$^{-1}$.

Thus, there was obtained an azetidinedione-monocarbonamide capped prepolymer in accordance with formula (III) above and having the formula

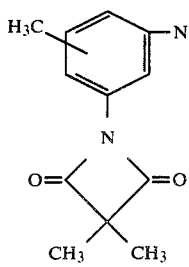

wherein the calculated value of x, y, and z are about 5, 1, and 8.3, respectively.

EXAMPLE 3

Using the same apparatus, procedure, and ingredients as in Example 1 except that the Hycar 1300X9 was replaced by Hycar 1300X13, there was prepared an azetidinedione-monocarbonamide capped prepolymer in accordance with the present invention.

The Hycar 1300X13 is similar to the 1300X9 material in being a difunctional carboxylic acid terminated polybutadiene nitrile rubber containing 27 percent by weight of acrylonitrile copolymer (supplied by B. F. Goodrich; equivalents per hundred parts of resin of 0.054, mole wt.=3704). A 185.2 g. (0.1 equivalent) sample of the Hycar along with the 0.131 g. of phospholene oxide were reacted over the 2.5 hour period with the 23.6 g.[0.1 equivalent] of the monoisocyanato-azetidinedione mixture described in Example 1.

The viscous liquid product obtained was analyzed by infrared spectroscopy and showed no NCO, COOH, or carbodiimide and strong amide absorption at 3400 to 3500 cm$^{-1}$.

Thus there was obtained an azetidinedione-monocarbonamide capped prepolymer in accordance with formula (III) above and having the formula

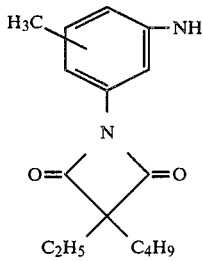

wherein the calculated values of x, y, and z are about 5, 1, and 11.2, respectively. Gel permeation chromatography showed the presence of about 2 to 3 weight percent of the diazetidinedione impurity present in the starting monoisocyanato-azetidinedione reactant.

EXAMPLE 4

Using the same apparatus, procedure, and ingredients as in Example 1 except that Hycar 2000X162 was employed, there was prepared an azetidinedione-monocarbonamide capped prepolymer in accordance with the present invention.

The Hycar 2000X162 is a difunctional carboxylic acid terminated polybutadiene rubber (supplied by B. F. Goodrich; equivalents per hundred parts of resin of 0.038, mole wt.=2632). A 263.2 g. (0.1 equivalent) sample of the Hycar along with 0.131 g. of phospholene oxide were reacted over the 2.5 hour period with the 23.6 g. (0.1 equivalent) of the monoisocyanato-azetidinedione mixture described in Example 1.

The viscous liquid product obtained was analyzed by infrared spectroscopy and showed no NCO, COOH, or carbodiimide and strong absorption at 3400 to 3500 cm$^{-1}$.

Thus there was obtained an azetidinedione-monocarbonamide capped prepolymer in accordance with formula (III) above and having the formula

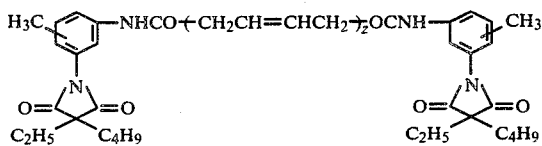

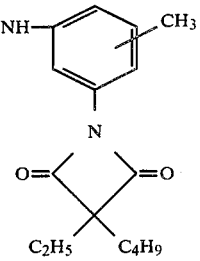

wherein the calculated value of z is about 47.1. Gel permeation chromatography showed the presence of about 2 to 3 weight percent of the diazetidinedione impurity present in the starting monoisocyanato-azetidinedione reactant.

EXAMPLE 5

The following experiment describes the preparation of an azetidinedione-monocarbonamide capped prepolymer in accordance with the present invention.

A two liter reaction flask was equipped with a magnetic stirring bar, condenser, thermometer, nitrogen inlet, and Dean-Stark trap. The flask was charged with 420.9 g. (0.3 equivalent) of a polyethyleneoxy-polypropyleneoxy diol having an equivalent weight of 1402 and being primary hydroxyl capped with a 20 percent by weight ethylene oxide content end-capping, 43.86 g. (0.6 equivalent) of adipic acid, 82 g. of xylene, and 0.1 percent by weight of p-toluene sulfonic acid monohydrate. The reaction solution was heated slowly to 185° C. and allowed to reflux for about 24 hours at this temperature. Over this period, the theoretical amount of water was removed (about 11 ml.). The reaction solution was heated under about 10 mm. of mercury pressure to remove all the xylene leaving a viscous colorless oil as the acid terminated polyether; observed acid #=35 (theor.=36.6); eq. wt.=1603.

A one liter reaction flask equipped as in Example 1 above was charged with 102 g. (0.064 eq.) of the acid terminated polyether prepared above and 0.08 g. of 1,3-dimethyl-3-phospholene-1-oxide. Under a nitrogen atmosphere the reaction mixture was stirred and heated at 175° to 176° C. and over 2.5 hours 15 g. (0.064 eq.) of the monoisocyanato-azetidinedione mixture described in Example 1 was added dropwise.

Thin film infrared analysis of the viscous liquid reaction product showed no NCO, COOH, or carbodiimide and strong amide absorption at 3400 to 3500 cm$^{-1}$.

3-butyl-2,4-dioxo-azetidino)diphenylmethane was added slowly over the 2.5 hour period; the latter reactant was obtained from the reaction of 4,4'-methylenebis(phenyl isocyanate) with 2-ethylhexanoyl chloride under the same basic conditions described in Example 1 above in accordance with U.S. Pat. No. 3,265,684.

The product obtained was a viscous liquid. Infrared analysis showed the absence of NCO, COOH, and carbodiimide and the presence of strong amide absorption at 3400 to 3500 cm$^{-1}$.

Thus there was obtained an azetidinedione-monocarbonamide capped prepolymer in accordance with formula (III) above and having the formula

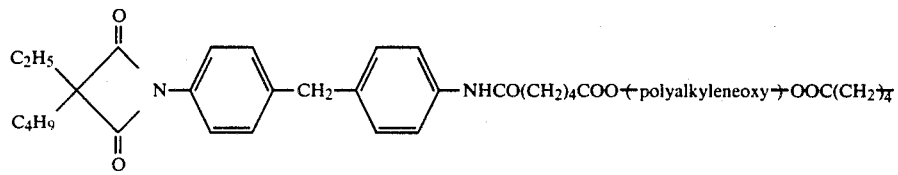

Thus, there was obtained an azetidinedione-monocarbonamide capped prepolymer in accordance with formula (III) above and having the formula

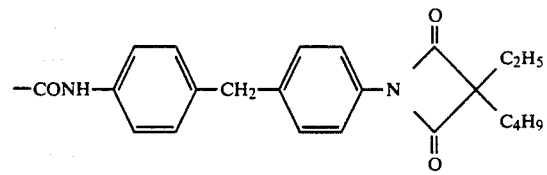

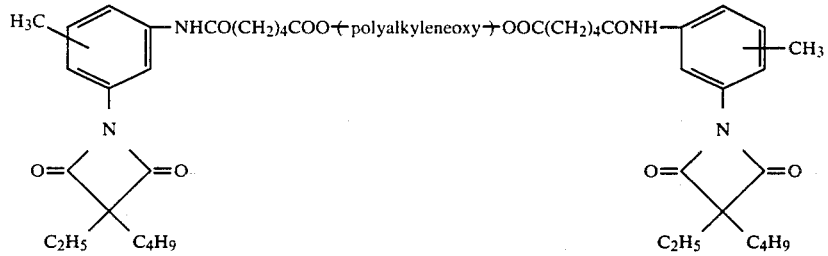

wherein the polyalkyleneoxy radical represents the residue of the polypropyleneoxy-polyethyleneoxy diol employed in the esterification reaction above after removal of the hydroxyl groups. Accordingly, the calculated weight of this polyalkyleneoxy radical is about 2770 containing 20 percent by weight of terminal polyethyleneoxy radicals.

Gel permeation chromatography of the product the presence of about 2 to 3 weight percent of the diazetidinedione impurity described in Example 1 as being present in the monoisocyanato-azetidinedione reactant.

EXAMPLE 6

Using the same apparatus and procedure as in Example 1, the acid terminated polyether described in Example 5, and the monoisocyanato-azetidinedione as noted below, there was prepared an azetidinedione-monocarbonamide capped prepolymer in accordance with the present invention.

A 160.3 g. (0.1 equivalent) sample of the acid terminated polyether was heated to 176° C. with the 0.131 g. of the phospholene oxide catalyst. A 36.63 g. (0.1 equivalent based on NCO) sample of 4-isocyanato-4'-(3-ethylwherein the polyalkyleneoxy radical represents the residue of the polypropyleneoxy-polyethyleneoxy diol employed in the esterification reaction above after removal of the hydroxyl groups. Accordingly, the calculated weight of this polyalkyleneoxy radical is about 2770 containing 20 percent by weight of terminal polyethyleneoxy radicals.

EXAMPLE 7

Using the same apparatus, procedure, and ingredients as in Example 1 except that the monoisocyanato-azetidinedione employed was that described in Example 6, there was prepared an azetidinedione-monocarbonamide capped prepolymer in accordance with the present invention.

The 138.9 g. (0.1 equivalent) sample of the Hycar 1300X9 and the 0.131 g. (1 mole percent based on moles of Hycar) of 1,3-dimethyl-3-phospholene-1-oxide were heated to 175 to 180° C. The 36.63 g. sample of the 4-isocyanato-4'-(3-ethyl-3-butyl-2,4-dioxo-azetidino)diphenylmethane was added over about 2.5 hours.

The product obtained was a viscous liquid. Infrared analysis showed the presence of strong amide absorption at 3400 to 3500 cm$^{-1}$ and absence of COOH, NCO, and carbodiimide.

Thus, there was obtained an azetidinedionemonocarbonamide capped prepolymer in accordance with formula (III) above and having the formula

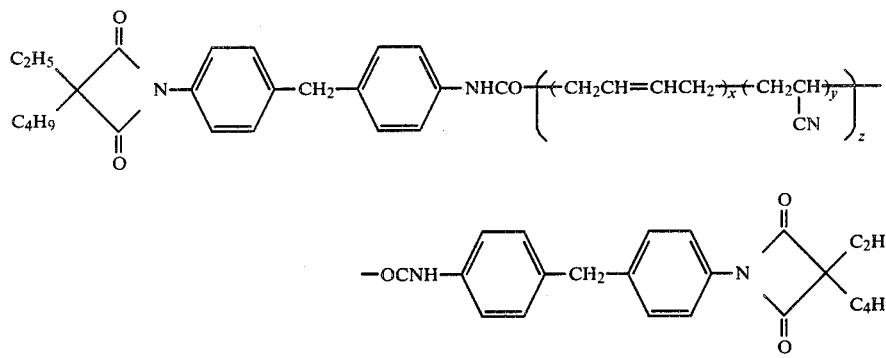

wherein the calculated values of x, y, and z are about 5, 1, and 8.3 respectively.

EXAMPLE 8

The following experiment describes the preparation of a polyamide block copolymer (Ia) in accordance with the present invention. Two preparations of the polyamide were carried out, one in a preliminary test tube experiment to determine gel time and the second preparation in a hand-mix procedure closely simulating a reaction injection molding (RIM) environment to obtain a molded polymer sample.

An 80.0 g. (0.71 mole) charge of freshly distilled ε-caprolactam was transferred under argon to a dry argon purged test tube equipped with a thermocouple for measuring temperature. The caprolactam was heated to 100° C. in an oil bath and 2.86 ml. of a 2.85 molar solution of ethyl magnesium bromide in diethyl ether (0.00817 mole of ethyl magnesium bromide or 1.15 mole percent based on caprolactam) was added to the molten material. Approximately 1 minute after the addition of the ethyl magnesium bromide, 20 g. of the azetidinedione-monocarbonamide capped prepolymer prepared in accordance with Example 1 above was added to the test tube. The contents were stirred by rapidly bubbling argon from the bottom of the test tube by means of a syringe needle. The reactants gelled in about 2 minutes to form a light yellow solid plug of polymer.

In the second preparation the proportions of reactants remained the same but the actual amounts were exactly doubled for each component including doubling the ml. of diethyl ether solution of ethyl magnesium bromide. To an "A" side comprising a beaker containing the caprolactam at 100° C. with nitrogen flowing over it, there was added the ether solution of the catalyst dropwise. The ether vapor was removed by the nitrogen flow as the molten mixture was stirred manually. The "B" side beaker contained the azetidinedione-monocarbonamide capped prepolymer also at 100° C. The two hot components were then both added to a jar, mixed rapidly with a stirring rod for 10 to 20 seconds and the fluid reactants quickly cast into an 8 inch by 8 inch by ⅛ inch stainless steel chrome-plated clam shell mold which was at a temperature of about 150° C. The mold was held at the 150° C. level for about 5 minutes before opening. A cream-colored plaque with very smooth surface finish was easily removed from the mold with immediate and easy release and with no warpage of the part. This was achieved in the absence of not only an internal release agent but also no release agent was employed on the mold surfaces.

Thus there was obtained the polyamide block copolymer containing about 20 percent by weight of soft segment and having the following formula

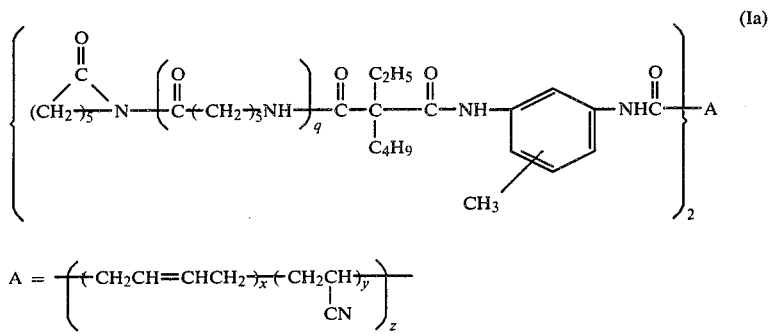

wherein the calculated values of x, y, and z are about 5, 1 and 8.3 respectively; and q has a mean value of about 58.4. The polymer had the following properties:

| | |
|---|---|
| Density (g/cc) | 1.0404 |
| Flexural str. (psi) | 10,930 |
| Flexural modulus (psi) | 248,900 |
| HDT[1] (°C.) | |
| 66 psi | 77 |
| 264 psi | 67 |
| Notched Izod[2] | 1.30 |

-continued ft-lbs/in. of notch

Footnotes
[1]HDT: Heat deflection temperature measured at the stated pressures in accordance with ASTM Test D648-56.
[2]Notched Izod impact strength: measured in accordance with ASTM Test D256-56.

EXAMPLE 9

Using the same apparatus, procedure, ingredients, and proportions as set forth in Example 8 except for the replacement of the azetidinedione-monocarbonamide capped prepolymer by the one described in Example 2, there was prepared a polyamide block copolymer (Ib) in accordance with the present invention.

The test tube preparation of the polymer had a gel time almost identical to that of Example 1, about 2 minutes.

A cream-colored molded plaque was obtained from the second preparation with the same easy release from the mold and smooth surface as that of Example 8. Thus there was obtained the polyamide block copolymer containing about 20 percent by weight of soft segment and having the following formula

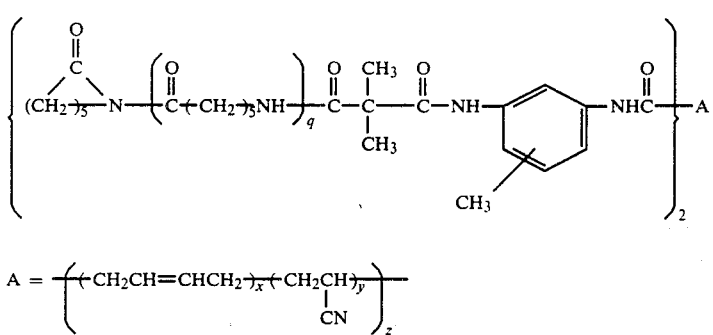

wherein the calculated values of x, y, and z are about 5, 1 and 8.3 respectively; and q has a mean value of about 56.3. The polymer had the following properties:

| | |
|---|---|
| Density (g/cc) | 1.0443 |
| Flexural str. (psi) | 10,370 |
| Flexural modulus (psi) | 235,600 |
| HDT (°C.) | |
| 66 psi | 82 |
| 264 psi | 54 |
| Notched Izod ft-lbs/in. of notch | 1.03 |

EXAMPLE 10

Using the same apparatus, procedure, ingredients, and proportions as set forth in Example 8 except for the replacement of the azetidinedione-monocarbonamide capped prepolymer by the one described in Example 3 there was prepared a polyamide block copolymer (Ic) in accordance with the present invention.

The test tube preparation of the polymer had a gel time almost identical to that of Example 1, about 2 minutes.

A cream colored molded plaque was obtained with the same easy release from the mold and smooth surface as that of Example 8. Thus there was obtained the polyamide block copolymer containing about 20 percent by weight of soft segment and having the following formula

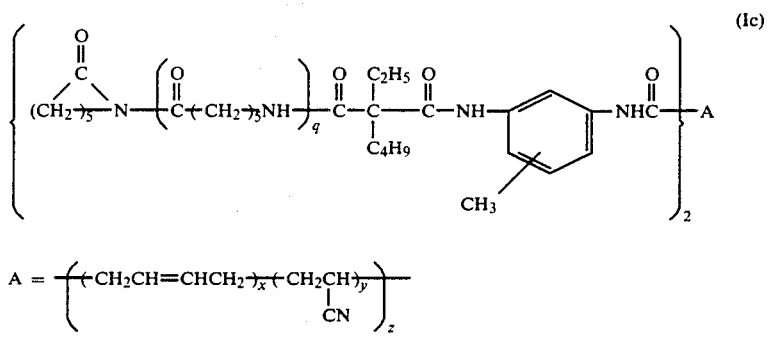

wherein the calculated values of x, y, and z are about 5, 1, and 11.2 respectively; and q has a mean value of about 75.5. The polymer had the following properties:

| | |
|---|---|
| Density (g/cc) | 1.0600 |
| Flexural str. (psi) | 11,320 |
| Flexural modulus (psi) | 249,700 |
| HDT (°C.) | |
| 66 psi | 164 |
| 264 psi | 58 |
| Notched Izod ft-lbs/in. of notch | 1.10 |

EXAMPLE 11

Using the same apparatus, procedure, ingredients, and proportions as set forth in Example 8 except for the replacement of the azetidinedione-monocarbonamide capped prepolymer by the one described in Example 4, there was prepared a polyamide block copolymer (Id) in accordance with the present invention. A second copolymer (Ie) also in accordance with the present invention was prepared using the identical procedure but employing the caprolactam and the prepolymer of Example 4 in the proportions by weight of 70 g. and 30 g. respectively.

Both of the polymers when prepared in the test tube had measured gel times of about 2 minutes.

polymer at 0.5 percent by weight solution in 88 percent formic acid at 30° C. was 0.94 dl/g.

A cream colored molded plaque was obtained with a smooth surface and easy release from the mold. Thus there was otained the polyamide block copolymer containing about 20 percent by weight of soft segment and having the formula

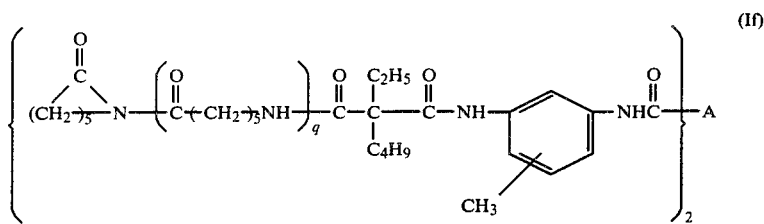

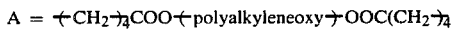

Both polymers were molded to form cream colored plaques with easy release from the molds and with smooth surfaces.

Thus there were obtained two copolymers having the general formula wherein the polyalkyleneoxy radical is the residue remaining after the removal of the hydroxyl groups from a polypropyleneoxy-polyethyleneoxy diol having an equivalent weight of 1402 and with a 20 percent by weight ethylene oxide end capping content; q has a

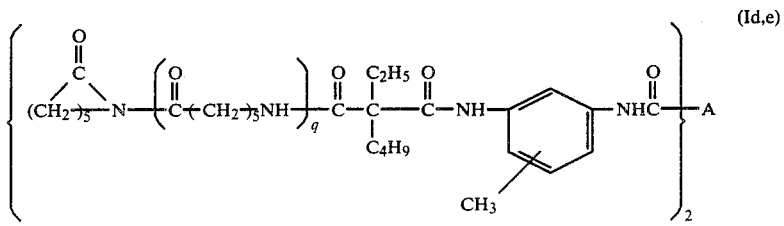

wherein the calculated value of z is about 47.1

Id: 20 percent by weight soft segment; q=mean value about 55.5

Ie: 30 percent by weight soft segment; q=mean value about 32.6

The polymers had the following properties:

|  | Id | Ie |
|---|---|---|
| Density (g/cc) | 1.0008 | 1.0776 |
| Flexural str. (psi) | 9,650 | 9,450 |
| Flexural modulus (psi) | 200,000 | 208,900 |
| HDT (°C.) |  |  |
| 66 psi | 94 | 77 |
| 264 psi | 59 | 62 |
| Notched Izod ft-lbs/in. of notch | 1.50 | 1.58 |

EXAMPLE 12

Using the same apparatus, procedure, ingredients, and proportions as set forth in Example 8 except for the replacement of the azetidinedione-monocarbonamide capped prepolymer by the one described in Example 5 there was prepared a polyamide block copolymer (If) in accordance with the present invention.

The test tube preparation of the polymer had a gel time of about 2 minutes. The inherent viscosity of the means value of about 63.4. The polymer had the following properties:

| Density (g/cc) | 1.0400 |
|---|---|
| Flexural str. (psi) | 7,540 |
| Flexural modulus (psi) | 177,200 |
| HDT (°C.) |  |
| 66 psi | 89 |
| 264 psi | 57 |
| Notched Izod ft-lbs/in. of notch | 11.8 |

EXAMPLE 13

Using the same apparatus, procedure, ingredients, and proportions as set forth in Example 8 except for the replacement of the azetidinedione-monocarbonamide capped prepolymer by the one described in Example 6 there was prepared a polyamide block copolymer (Ig) in accordance with the present invention.

The test tube preparation of the polymer had a gel time of about 2 minutes.

A cream colored molded plaque was obtained with a smooth surface and easy release from the mold. Thus there was obtained the polyamide block copolymer containing about 20 percent by weight of soft segment and having the formula

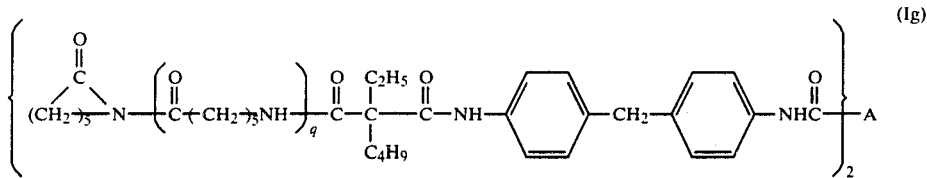

A = $-(-CH_2-)_3COO-(-polyalkyleneoxy-)-OOC(CH_2-)_3$ wherein the polyalkyleneoxy radical is the same as the one defined in Example 12; q has a mean value of about 65.7. The polymer had the following properties:

| | |
|---|---|
| Density (g/cc) | 1.1190 |
| Flexural str. (psi) | 8,280 |
| Flexural modulus (psi) | 182,400 |
| HDT (°C.) | |
| 66 psi | 99 |
| 264 psi | 57 |
| Notched Izod ft-lbs/in. of notch | 5.00 |

EXAMPLE 14

Using the same apparatus, procedure, ingredients, and proportions as set forth in Example 8 except for the replacement of the azetidinedione-monocarbonamide capped prepolymer by the one described in Example 7, there was prepared a polyamide block copolymer (Ih) in accordance with the present invention. A second copolymer (Ii) also in accordance with the present invention was prepared using the identical procedure but employing the caprolactam and the prepolymer of Example 7 in the proportions by weight of 90 g. and 10 g., respectively.

Both of the polymers when prepared in the test tube had measured gel times of about 2 minutes.

Both polymers were molded to form cream colored plaques with easy release from the molds and with smooth surfaces.

Thus there were obtained two copolymers having the general formula

The polymers had the following properties:

| | Ih | Ii |
|---|---|---|
| Density (g/cc) | 1.0392 | 1.0592 |
| Flexural str. (psi) | 9,870 | 11,240 |
| Flexural modulus (psi) | 210,400 | 265,400 |
| HDT (°C.) | | |
| 66 psi | 72 | 144 |
| 264 psi | 54 | 66 |
| Notched Izod ft-lb/in of notch | 2.14 | 0.97 |

EXAMPLE 15

Using the same apparatus, procedure, ingredients, and proportions as set forth in Example 8 except for the replacement of the azetidinedione-monocarbonamide capped prepolymer by a trisazetidinedione urethane prepared as described below, there was prepared a polyamide block copolymer (Ij) in accordance with the present invention.

A one liter reaction flask equipped with a magnetic stirrer, thermometer, reflux condenser, and nitrogen inlet was charged with 207.8 g. (0.1 equivalent) of SF-6503 which is a polyethyleneoxy-polypropyleneoxy triol of 2078 equivalent weight (supplied by Texaco Chemical Co.), 23.6 g. (0.1 equivalent) of the monoisocyanato-azetidinedione described in Example 1, and 1 drop of dibutyl tin dilaurate. The reaction solution was stirred and heated for 3 hours under nitrogen. The trisazetidinedione product was a viscous light yellow colored oil and was used directly as obtained in the polyamide preparation.

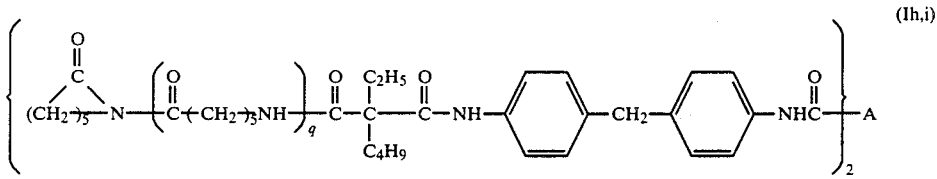

A = $-(-(-CH_2CH=CHCH_2-)_x-(-CH_2CH-)_y-)_z-$
                                    |
                                    CN wherein the calculated values of x, y, and z are about 5, 1 and 8.3 respectively.

Ih: 20percent by weight soft segment; q=mean value about 61.2

Ii: 10 percent by weight soft segment; q=mean value about 137

The test tube preparation of the polymer had a gel time of about 2 minutes.

A cream colored molded plaque was obtained with a smooth surface and easy release from the mold. Thus there was obtained the polyamide block copolymer containing about 20 percent by weight of soft segment and having the formula

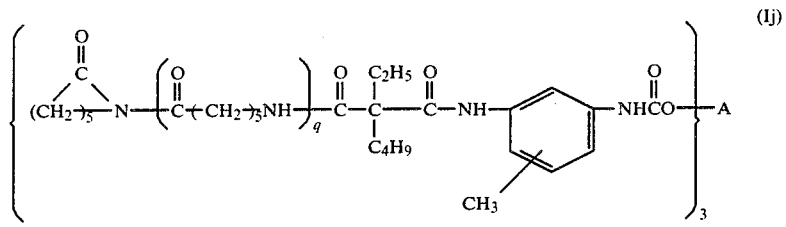

A = —polyalkyleneoxy— wherein the polyalkyleneoxy radical is the residue remaining after the removal of the three hydroxyl groups from the polyethyleneoxy-polypropyleneoxy triol employed above in the preparation of the trisazetidinedione-urethane; q has a mean value of about 84.5. The polymer had the following properties:

| Density (g/cc) | 1.0971 |
|---|---|
| Flexural str. (psi) | 8,650 |
| Flexural modulus (psi) | 189,200 |
| HDT (°C.) | |
| 66 psi | 62 |
| 264 psi | 54 |
| Notched Izod ft-lbs/in. of notch | 14.0 |

EXAMPLE 16

Using the same apparatus, procedure, ingredients and proportions as set forth in Example 8 except for the replacement of the azetidinedione-monocarbonamide capped prepolymer by a bisazetidinedione urethane prepared as described below, there was prepared a polyamide block copolymer (Ik) in accordance with the present invention.

A one liter reaction flask equipped with a magnetic stirrer, thermometer, reflux condenser, and nitrogen inlet was charged with 179.2 g. (0.1 equivalent) of a hydroxyl terminated difunctional polybutadiene nitrile rubber containing about 17 percent by weight acrylonitrile copolymer (supplied by B. F. Goodrich as Hycar 1300 X17; equivalents per hundred parts of resin of 0.028; mole wt.=3584), 35.4 g. (0.1 equivalent) of a monoisocyanato-azetidinedione similarly prepared to that disclosed in Example 6 but having a slightly different equivalent weight of 354 (determined by butylamine titration of the isocyanate), and 1 drop of dibutyl tin dilaurate. The reaction solution was stirred and heated for 3 hours under nitrogen. The bisazetidinedione product was a viscous light amber colored oil and was used directly as obtained in the polyamide preparation.

The test tube preparation of the polymer had a gel time of about 2 minutes. A cream colored molded plaque was obtained with a smooth surface and easy release from the mold. Thus there was obtained the polyamide block copolymer containing about 20 percent by weight of soft segment and having the formula

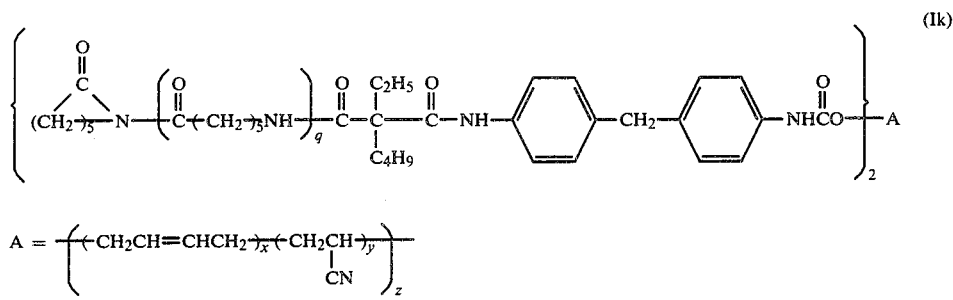

wherein the calculated values of x, y, and z are about 5, 1, and 8, respectively; q has a mean value of about 77.2. The polymer had the following properties:

| Density (g/cc) | 1.0100 |
|---|---|
| Flexural str. (psi) | 9,270 |
| Flexural modulus (psi) | 191,900 |
| HDT (°C.) | |
| 66 psi | 89 |
| 264 psi | 54 |
| Notched Izod ft-lbs/in. of notch | 2.00 |

EXAMPLE 17

Using the same apparatus, procedure, ingredients, and proportions as set forth in Example 8 except for the replacement of the azetidinedione-monocarbonamide capped prepolymer by a bisazetidinedione urethane prepared as described below, there was prepared a polyamide block copolymer (Il) in accordance with the present invention.

A one liter reaction flask equipped with a magnetic stirrer, thermometer, reflux condenser, and nitrogen inlet was charged with 140.3 g. (0.1 equivalent) of the polyethyleneoxy-polypropyleneoxy diol described in the preparation of the acid terminated polyether in Example 5, 23.6 g. (0.1 g.) of the monoisocyanatoazetidinedione described in Example 1, and 1 drop of dibutyl tin dilaurate. The reaction solution was stirred and heated for 3 hours under nitrogen. The bisazetidinedione product was a viscous light yellow colored oil and was used directly as obtained in the following polyamide preparation.

The test tube preparation of the polymer had a gel time of about 2 minutes. A cream colored molded plaque was obtained with a smooth surface and easy release from the mold. Thus there was obtained the polyamide block copolymer containing about 20 percent by weight of soft segment and having the formula

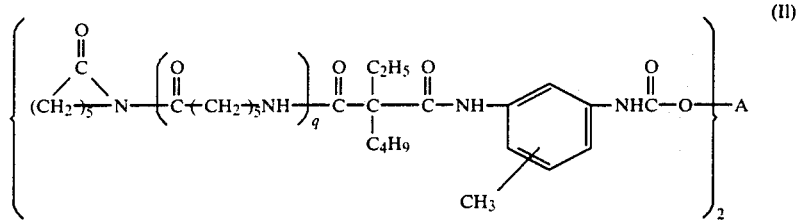

A = —polyalkyleneoxy— wherein the polyalkyleneoxy radical is the residue remaining after the removal of the hydroxyl groups from the polyethyleneoxy-polypropyleneoxy diol described above in the preparation of the bisazetidinedione urethane; q has a mean value of about 60.2. The polymer had the following properties:

| Density (g/cc) | 1.1010 |
| Flexural str. (psi) | 9,080 |
| Flexural modulus (psi) | 253,400 |
| HDT (°C.) | |
| 66 psi | 74 |
| 264 psi | 58 |
| Notched Izod ft-lbs/in. of notch | 6.70 |

EXAMPLE 18

The following experiment describes the preparation of the same polyamide block copolymer (Ia) described in Example 8 above but this time prepared in accordance with the present invention using a high shear melt polymerization procedure.

To a 40 g. sample of ε-caprolactam at about 100° C. there was added 1.43 ml. of the ethyl magnesium bromide catalyst solution described in Example 8. The mixture was stirred under a nitrogen flow to flush away the diethyl ether vapors. This solution was added simultaneously with 10 g. of an azetidinedione-monocarbonamide capped prepolymer identified and described in Example 1 to the mix-head of a Brabender Plasti-corder melt polymerization reaction chamber.

The mix-head was held at 240 to 245° C. and two #6 mixing blades were run at 30 r.p.m. At initiation the full scale deflection on the recorder was set for 1000 meter-grams. After about a full minute, gelation began to occur as noted on the torque scale. The scale was adjusted to show full scale deflection of 5000 meter-grams to allow the trace to stay on the chart and to follow viscosity changes. The viscosity stabilized after about 11 minutes. After about 20 minutes the polymer was removed from the mix-head.

The polyamide was chopped by hand, ground in a Wiley mill using #20 mesh, and finally compression molded in a 3.0 inch by 2.0 inch by 1/16 inch mold. The mold temperature was 205° C. to 210° C. with slight initial pressure at first which was raised up to 400 psi. The samples remained in the hot mold under this pressure for about 5 minutes. This sample was identified as Ex18-Ia, and was analyzed by differential scanning calorimetry (DSC) to determine its $T_m$. Its inherent viscosity was determined at 0.5 percent by weight in 88 percent formic acid at 30° C. This data is set forth below in comparison with corresponding measurements on the polyamide sample from Example 8 and identified as Ex8-Ia.

| | $T_m$ | $\eta_{inh}$ |
|---|---|---|
| Ex8-Ia | 203° C. and 223° C. | 2.13 dl/g. |
| Ex18-Ia | 200° C. | 1.75 dl/g. |

The inherent viscosity and $T_m$ data clearly show that polyamides in accordance with the present invention can be prepared in high molecular weight using melt-extrusion methods. The two $T_m$ values observed for the Ex-Ia sample are assumed to be due to two differing molecular weight species. The polyamides are characterized by good high temperature stability as shown by the exposure of Ex18-Ia to the 240 to 245° C. temperature for 20 minutes in the mix-head without degradation occurring.

EXAMPLE 19

Using the procedure and Brabender apparatus described in Example 18 there was prepared the same polyamide block copolymer (If) described in Example 12 above in accordance with the present invention. In this experiment, 10 g. of the azetidinedione-monocarbonamide capped prepolymer described in Example 5 was added to the mix-head of the Brabender.

After about 0.5 minute the viscosity started to rise rapidly indicating a gelation. Full scale deflection was changed to 5000 meter-grams in order to follow viscosity changes. The viscosity stabilized after about 5 minutes and a polymer sample was removed. The remaining polymer was allowed to stay in the mix-head for 20 minutes under the high shear conditions before being removed. Both of the samples were chopped, powdered, and molded according to the procedure set forth in Example 18 to provide samples Ex19-If5 and Ex19-If20 respectively for comparison with Ex12-If in respect of $T_m$ and $\eta_{inh}$.

| | $T_m$ | $\eta_{inh}$ |
|---|---|---|
| Ex12-If | 216° C. | 1.05 |
| Ex19-If5 | 210° C. and 219° C. | 1.35 |
| Ex19-If20 | 215° C. | 1.14 |

This experiment shows that the present polymers can be readily prepared by melt extrusion methods in high molecular weight without degradation or undue molecular weight loss. No molecular weight climb occurred at the elevated processing temperatures, as evidenced by a decrease in $\eta_{inh}$ for Ex19-If20 over $\eta_{inh}$ for Ex19-If5. This also indicates that there were no significant detrimental side reactions, such as crosslinking, taking place.

FORMULA CHART

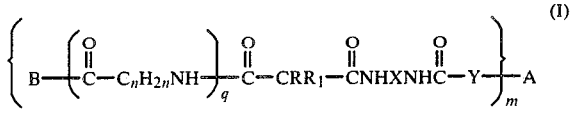

$X = $ inter alia, 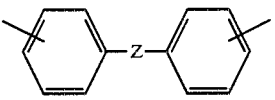

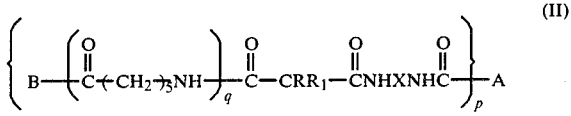

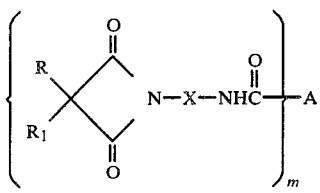

REACTION CHART

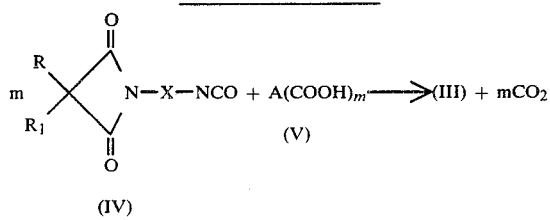

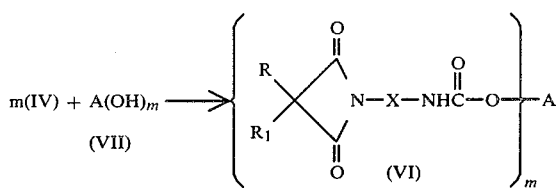

We claim:

1. A polyamide block copolymer having the formula (I)

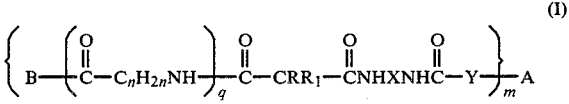

wherein A is the residue of a polymeric polyol or a polycarboxylic acid having a molecular weight of from about 500 to about 8000 and a functionality m of from about 2 to about 6, Y represents —O— when said A is the residue of a polymer polyol or a direct bond when A is the residue of a polycarboxylic acid, R and $R_1$ when taken separately are independently selected from the group consisting of hydrogen and hydrocarbyl, and when R and $R_1$ are taken together with the carbon atom to which they are joined represent a cycloalkane having 4 to 8 ring carbon atoms, inclusive, X is selected from the group consisting of lower alkylene, cycloalkylene, arylene, and divalent radicals having the formula

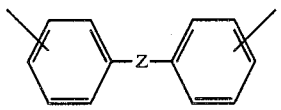

wherein Z is selected from the group consisting of —CO—, —O—, —SO$_2$—, and alkylene having 1 to 4 carbon atoms, inclusive, $C_nH_{2n}$ represents an alkylene radical of 3 to 12 carbon atoms, inclusive, present in a polyamide recurring unit wherein q has a mean value of at least about 2, and B is a polyamide chain terminating group.

2. A polyamide block copolymer according to claim 1 wherein the weight percent proportion of said polyamide block is from about 25 percent to about 90 percent of said copolymer.

3. A polyamide block copolymer according to claim 1 wherein Y is —O— and A is the residue of a polymeric polyol.

4. A polyamide block copolymer according to claim 1 wherein Y is a direct bond and A is the residue of a polycarboxylic acid.

5. A polyamide block copolymer according to claim 1 wherein m has a value of from about 2 to about 3 and R and $R_1$ are the same or different alkyl having 1 to 4 carbon atoms.

6. A polyamide block copolymer according to claim 1 wherein X is arylene.

7. A polyamide block copolymer according to claim 1 wherein X is a divalent radical having the formula

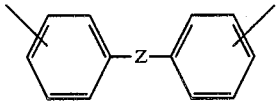

wherein Z is selected from the group consisting of —CO—, —O—, —SO$_2$—, and alkylene having 1 to 4 carbon atoms, inclusive.

8. A polyamide block copolymer according to claim 1 wherein $C_nH_{2n}$ is —(CH$_2$)$_5$—.

9. A polyamide block copolymer according to claim 1 wherein A is the residue of a polymeric polyol having a functionality m of from about 2 to about 3 and a molecular weight of from about 1000 to about 6500.

10. A polyamide block copolymer according to claim 1 wherein A is the residue of a polycarboxylic acid having a functionality of from about 2 to about 3 and a molecular weight of from about 1000 to about 6000.

11. A polyamide block copolymer having the formula (II)

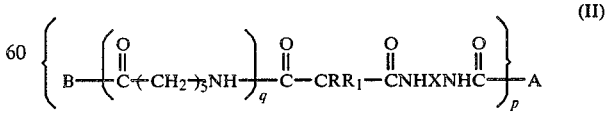

wherein A is the residue of a polycarboxylic acid having a molecular weight of from about 1000 to about 6000 and a functionality p of from about 2 to about 3, R and $R_1$ when taken separately are independently selected from the group consisting of hydrogen and hydrocarbyl, and when taken together with the carbon atom to which they are joined represent a cycloalkane having 4 to 8 ring carbon atoms, inclusive, X is selected from the group consisting of lower alkylene, cycloalkylene, arylene, and divalent radicals having the formula

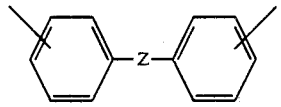

wherein Z is selected from the group consisting of —CO—, —O—, and —SO$_2$—, and alkylene having 1 to 4 carbon atoms, inclusive, q has a mean value of at least about 2, the weight percent proportion of said polyamide block is from about 25 percent to about 90 percent of said copolymer, and B is a polyamide chain terminating group.

12. A polyamide block copolymer according to claim 11 wherein R and R$_1$ are the same or different alkyl having 1 to 4 carbon atoms.

13. A polyamide block copolymer according to claim 11 wherein X is arylene

14. A polyamide block copolymer according to claim 11 wherein X is a divalent radical having the formula

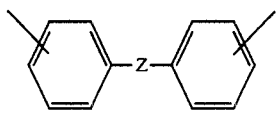

wherein Z is selected from the group consisting of —CO—, —O—, —SO$_2$—, and alkylene having 1 to 4 carbon atoms, inclusive.

15. A polyamide block copolymer according to claim 11 wherein A is the residue of a polycarboxylic acid having a functionality p of about 2 and a molecular weight of from about 2000 to about 4000.

16. A polyamide block copolymer according to claim 15 wherein R and R$_1$ are ethyl and butyl respectively.

17. A polyamide block copolymer according to claim 16 wherein X is selected from the formula consisting of

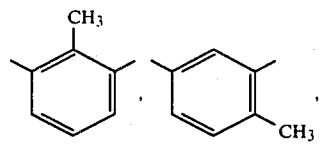

and mixtures thereof.

18. A polyamide block copolymer according to claim 16 wherein X has the formula

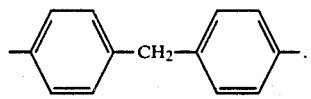

19. The method for the preparation of the polyamide block copolymer (I) according to claim 1 by the reaction injection molding procedure by injecting into a closed mold a reaction mixture comprising, 1. an azetidine-2,4-dione monocarbonamide capped prepolymer selected from the group consisting of

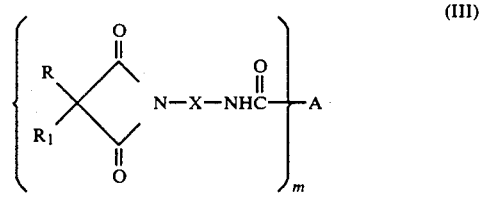

when A in said (I) is the residue of a polycarboxylic acid and Y represents a direct bond and

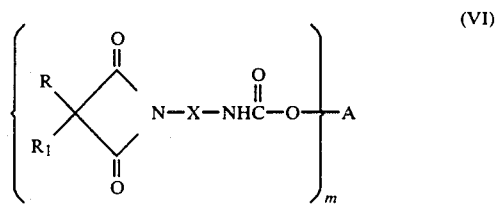

When A in said (I) is the residue of a polymer polyol and Y represents —O—wherein m, R, R$_1$, and x are as defined in claim 1 above;

2. a lactam; and
3. a lactam polymerization catalyst.

* * * * *